United States Patent [19]
Salz et al.

[11] 4,170,764
[45] Oct. 9, 1979

[54] AMPLITUDE AND FREQUENCY MODULATION SYSTEM

[75] Inventors: Jack Salz, Fair Haven; Jean J. Werner, Eatontown, both of N.J.

[73] Assignee: Bell Telephone Laboratories, Incorporated, Murray Hill, N.J.

[21] Appl. No.: 883,656

[22] Filed: Mar. 6, 1978

[51] Int. Cl.$^2$ .................. H03C 5/00; H04L 27/12
[52] U.S. Cl. ........................ 332/17; 325/30; 325/139; 325/163; 332/22; 332/41
[58] Field of Search .......... 325/139, 30, 163; 332/17, 22, 41

[56] References Cited

U.S. PATENT DOCUMENTS

| | | | |
|---|---|---|---|
| 1,734,038 | 11/1929 | Levy | 332/17 |
| 2,611,826 | 9/1952 | Kalfaian | 332/17 |
| 3,054,073 | 9/1962 | Powers | 332/17 |
| 3,213,368 | 10/1965 | Geluk | 332/17 |
| 3,249,896 | 5/1966 | Baker | 332/14 |
| 3,486,117 | 12/1969 | Groves et al. | 332/17 |
| 3,619,503 | 11/1971 | Ragsdale | 178/66 |
| 3,715,474 | 2/1973 | Calfee et al. | 332/17 |
| 3,895,316 | 7/1975 | Fein | 332/17 |

*Primary Examiner*—Siegfried H. Grimm
*Attorney, Agent, or Firm*—Roy C. Lipton

[57] ABSTRACT

Combined amplitude and frequency-shift-keying (AM-FSK) modulation of a carrier wave by a baseband data signal achieves significant suppression of one of the sidebands to ease the design requirements of filters generally used in the transmission of FSK signals. The significant suppression effect is observed when the ratio of minimum to maximum amplitude of the envelope of the amplitude modulated carrier wave is restrained to be approximately between 0.6 and 0.9.

In one embodiment amplitude modulation is performed by a pair of amplifiers, each having a predetermined gain. In another embodiment, an all digital technique is used to synthesize the AM-FSK signal.

3 Claims, 5 Drawing Figures

AMPLITUDE AND FREQUENCY MODULATION SYSTEM

FIELD OF THE INVENTION

This invention relates to frequency modulation systems and more particularly to systems that further include amplitude modulation.

BACKGROUND OF THE INVENTION

Frequency-shift-keyed (FSK) modulation is used extensively in data communications in a primary channel of a low speed modem and in a secondary or reverse channel of a high speed modem. Frequency-shift-keying is an abrupt modulation technique that creates a signal having theoretically infinite bandwidth. In frequency division multiplex transmission systems where each channel is allocated a fixed bandwidth the sidebands of an FSK signal can cause adjacent channel interference, therefore some filtering is generally required before the FSK signal can be transmitted. Filtering requirements can be formidable, however, and efforts have been made to shape the spectrum of the FSK signal prior to filtering to ease the filter design requirements and thereby reduce their cost.

In U.S. Pat. No. 3,054,073 issued to K. H. Powers on Sept. 11, 1962, there is disclosed a technique utilizing amplitude and angular-velocity modulation in which the angular-velocity of a carrier wave is modulated by a baseband signal and the amplitude of the angular-velocity modulated carrier is modulated by a signal that is an exponential transform of the baseband signal. Such a technique results in a single sideband angular-velocity modulated signal but is complex and costly to implement. Also, the bandwidth of the resulting single sideband signal may be wider than the original signal.

In U.S. Pat. No. 3,895,316 issued to H. Fein on July 15, 1975, the technique of combining frequency modulation and amplitude modulation without transformation of the baseband signal was utilized. The steps of frequency modulation and suppressed carrier amplitude modulation are used to achieve a "chirping" quality in the resulting audible sound to thereby enhance the discernability of the sound to a listener. This suppressed carrier technique, however, consumes more bandwith than frequency modulation alone.

It is, therefore, an object of this invention to decrease the out-of-band energy content of a frequency modulated signal prior to filtering.

It is another object of this invention to provide spectral shaping in a simple and inexpensive manner.

SUMMARY OF THE INVENTION

In accordance with the invention, significant suppression of one sideband of a carrier wave, frequency modulated by a baseband signal, is achieved by simultaneous and direct amplitude modulation of the frequency modulated carrier wave with the baseband signal when a ratio ($p$) of minimum to maximum amplitudes of the envelope of the carrier wave is substantially constrained by the inequality $0.6 < p < 0.9$.

In one illustrative embodiment the output of a prior art FSK modulator is amplitude modulated by the same binary input signal used to control the FSK process. Amplitude modulation is performed utilizing an analog technique whereby a pair of amplifiers, each having a predetermined gain, are selectively enabled by the binary signal to amplify the FSK signal to thereby achieve a combination of amplitude modulation and frequency-shift-keying hereinafter referred to as AM-FSK.

In another illustrative embodiment an all digital technique is used to synthesize the AM-FSK signal. A periodic signal is generated by digitally accumulating the addition of predetermined phase increments. The period is set by the rate at which phase increments are added, the size of the phase increments and the capacity of the register used to accumulate the increments. The phase is transformed into a digital sine wave which is thereafter multiplied with a digital representation of the amplitude level. Thereafter, digital to analog conversion completes the process.

DETAILED DESCRIPTION

Figure 1:
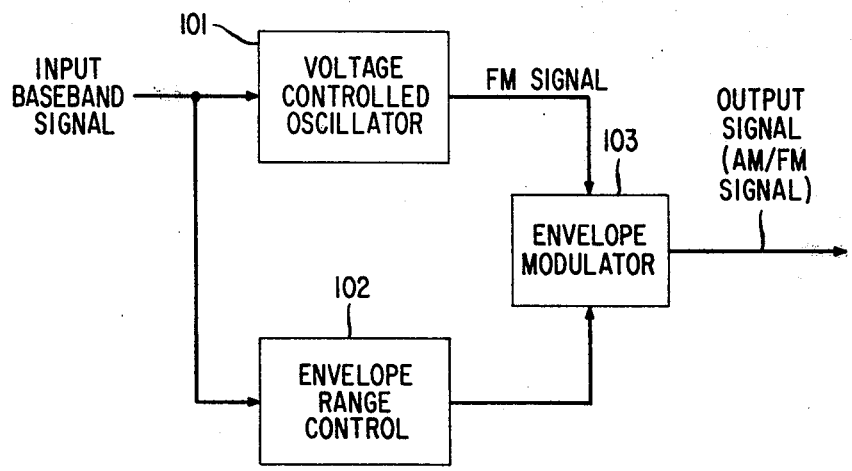
FIG. 1 discloses, in block form, an amplitude and frequency modulated generator in accordance with the invention.

The method for combining amplitude and a frequency modulation in accordance with this invention is depicted in FIG. 1. An input signal having a time-varying amplitude is applied to voltage controlled oscillator 101 to control the frequency of the oscillator in accordance with the amplitude of the input baseband signal to thereby generate a frequency modulated (FM) signal. The output of the voltage controlled oscillator (VCO) is a periodic waveform, such as a sine wave, having a constant envelope amplitude. The envelope amplitude of the VCO output signal is regulated by envelope modulator 103 in accordance with the amplitude of the input baseband signal. It is noted that both the frequency and the amplitude of the output signal are varied. Envelope range control 102 is that portion of envelope modulator 103 that sets the envelope range of the output signal. When the envelope range control is arranged to vary the amplitude of the output signal in direct proportion to its frequency variation (i.e. decrease the amplitude when the frequency decreases), it has been discovered that the envelope modulator significantly suppresses the lower sideband of the FM signal. When the envelope range control is arranged to vary the amplitude of the output signal in inverse proportion to its frequency variation (i.e. decrease the amplitude when the frequency increases), it has been discovered that the envelope modulator significantly suppresses the upper sideband of the FM signal.

The amplitude of the resulting envelope is arranged to vary between a minimum value which for convenience is designated "A" and a maximum value designated "B". A ratio ($p$) of the minimum to the maximum value is useful in understanding the invention and is defined by the equality $p = A/B$. As will be shown later a range of values for $\rho$ exists that provides substantial suppression of one of the sidebands of the FM signal. For the example case when $\rho=0.75$, envelope range control 102 scales the dynamic range of the input baseband signal into a range suitable to set the minimum level of the envelope amplitude of the output signal at 0.75 times the maximum level of the envelope amplitude of the output signal.

Figure 2:
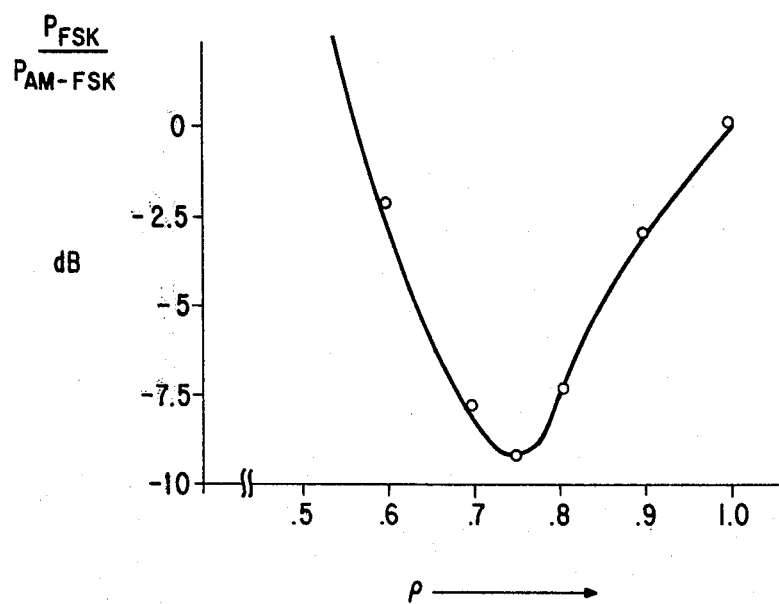
FIG. 2 shows a graph illustrating the amount of power by which a pure FSK signal must be decreased to achieve the same sideband power reduction as an AM-FSK signal for various amounts of amplitude modulation.

FIG. 2 illustrates that useful suppression of a sideband is possible over a range of values substantially defined by the inequality $0.6<\rho<0.9$ in the case of binary frequency-shift-keying (FSK). Note that pure FSK is the case whereby $\rho=1$ and on-off keying of a carrier wave is the case whereby $\rho=0$. FIG. 2 demonstrates the equivalent attenuation of a pure FSK signal required to achieve the same reduction in the power of a suppressed sideband. For example, an FSK signal attenuated by approximately 9 dB has the same power in either of its sidebands as the residual power of the suppressed sideband of the same FSK signal amplitude modulated such that $\rho=0.75$.

Due to amplitude modulation the performance of AM-FSK in the presence of Gaussian noise is somewhat decreased in comparison with pure FSK. In the case where $\rho=0.75$ the degradation in signal-to-noise ratio is about 1.5 dB.

The optimum value of $\rho$ is found by minimizing the residual power in an upper sideband, for example where the power spectrum $P_\mu$ of the AM-FSK signal given by:

$$P_\mu = \int_{v_l}^{\infty} \cos^2 v \left[ \frac{A}{\alpha - Tv} + \frac{B}{\alpha + Tv} \right]^2 dv \quad (1)$$

where $\alpha=\pi/2$, $v_l=4\alpha/T$ and T is the period of each transmitted symbol. The functional $P_\mu$ is minimized under the power constraint:

$$P = A^2 + B^2 = \text{Constant} \quad (2)$$

This variational problem can be solved in a relatively straightforward manner by introducing Lagrangian multipliers for the evaluation with the ultimate result that the optimum value of $\rho=0.7623$.

Figure 3:
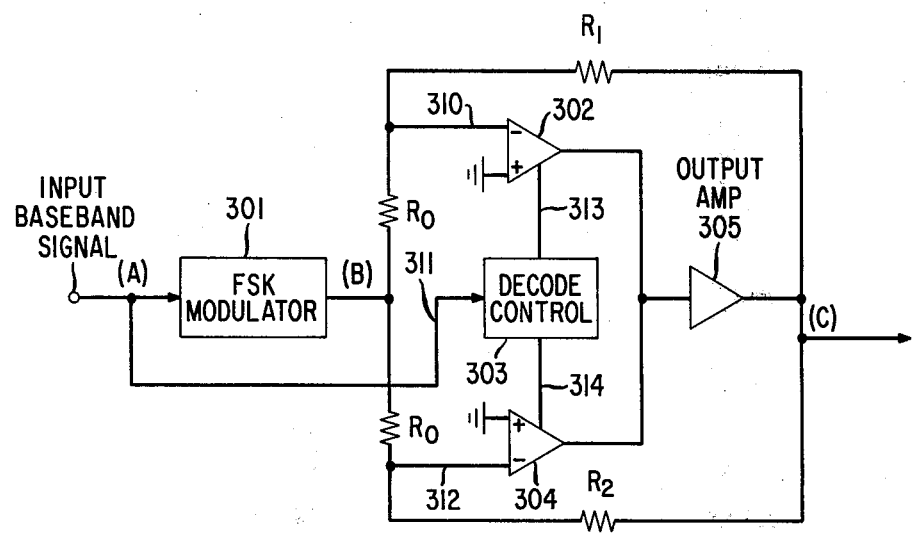
FIG. 3 discloses, in schematic form, an embodiment of the invention utilizing analog circuits.

FIG. 3 discloses a more detailed embodiment of the invention constructed with commercially available components and designed for the case of a binary input signal. FSK modulator 301 is a frequency shift transmitter such as the type taught in U.S. Pat. No. 3,249,896 issued to W. E. Baker on May 3, 1966. Circuits 302–305 are parts of a programmable amplifier available on a single chip such as the HA-2400 from Harris Semiconductor Corporation.

Figure 4:
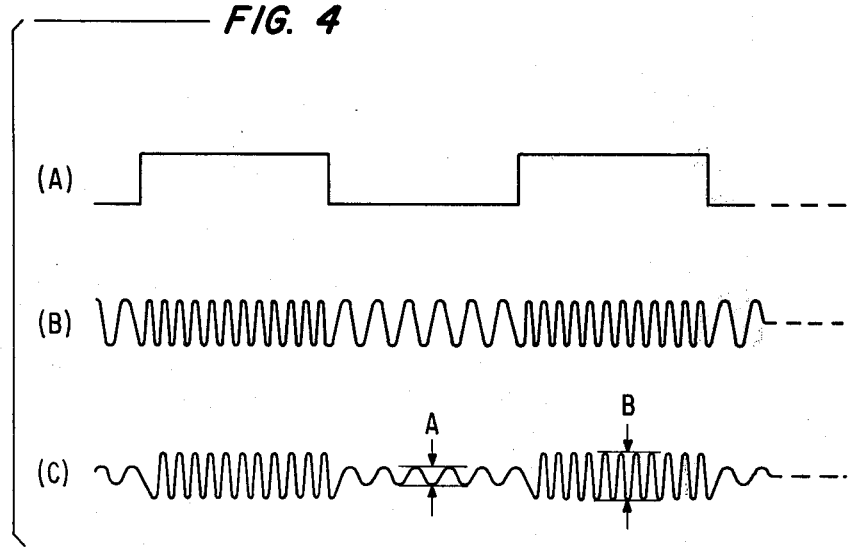
FIG. 4 illustrates time varying waveforms associated with FIG. 3 that are useful in understanding the invention.

The input signal to FSK modulator 301 is a binary signal such as shown in FIG. 4(A). The FSK modulator generates a sine wave having a high frequency when the input signal is a logic 1 and a low frequency when the input signal is a logic 0. The output impedance of FSK modulator 301 is negligible in comparison with the value of resistor $R_0$. The output of the modulator is a pure FSK signal such as the one shown in FIG. 4(B). The baseband signal is directly utilized to regulate the amplitude of the FSK signal. Decode control circuit 303 responds to a logic 1 on input lead 311 by enabling amplifier 302 and disabling amplifier 304; it responds to a logic 0 input by enabling amplifier 304 and disabling amplifier 302. Amplifiers 302 and 304 are input stages of an overall amplifier whose output stage is designated amplifier 305.

The amplification of a signal that passes through amplifiers 302 and 305 is fixed by the magnitude of the resistors $R_0$ and $R_1$ and is equal to $R_1/R_0$. The amplification of a signal that passes through amplifier 304 and 305 is similarly fixed and is equal to $R_2/R_0$. When, as in the example embodiment, it is desirable to significantly suppress the lower sideband of the FSK signal, the following relation between the resistance values is appropriate: $R_2=0.75R_1$. Such a selection would result in the output waveform of FIG. 4(C). If, on the other hand, the upper sideband is to be significantly suppressed, the following relation between resistors is appropriate: $R_1=0.75R_2$.

In many applications, however, the best mode of operation resides in the time-shared use of a digital processor which, while relatively complex in overall operation and unlikely to warrant serious consideration in the absence of special circumstances, may provide increased efficiency. Such an implementation is shown in FIG. 5, which is all digital and advantageously yields to LSI (Large Scale Integration) construction.

Figure 5:
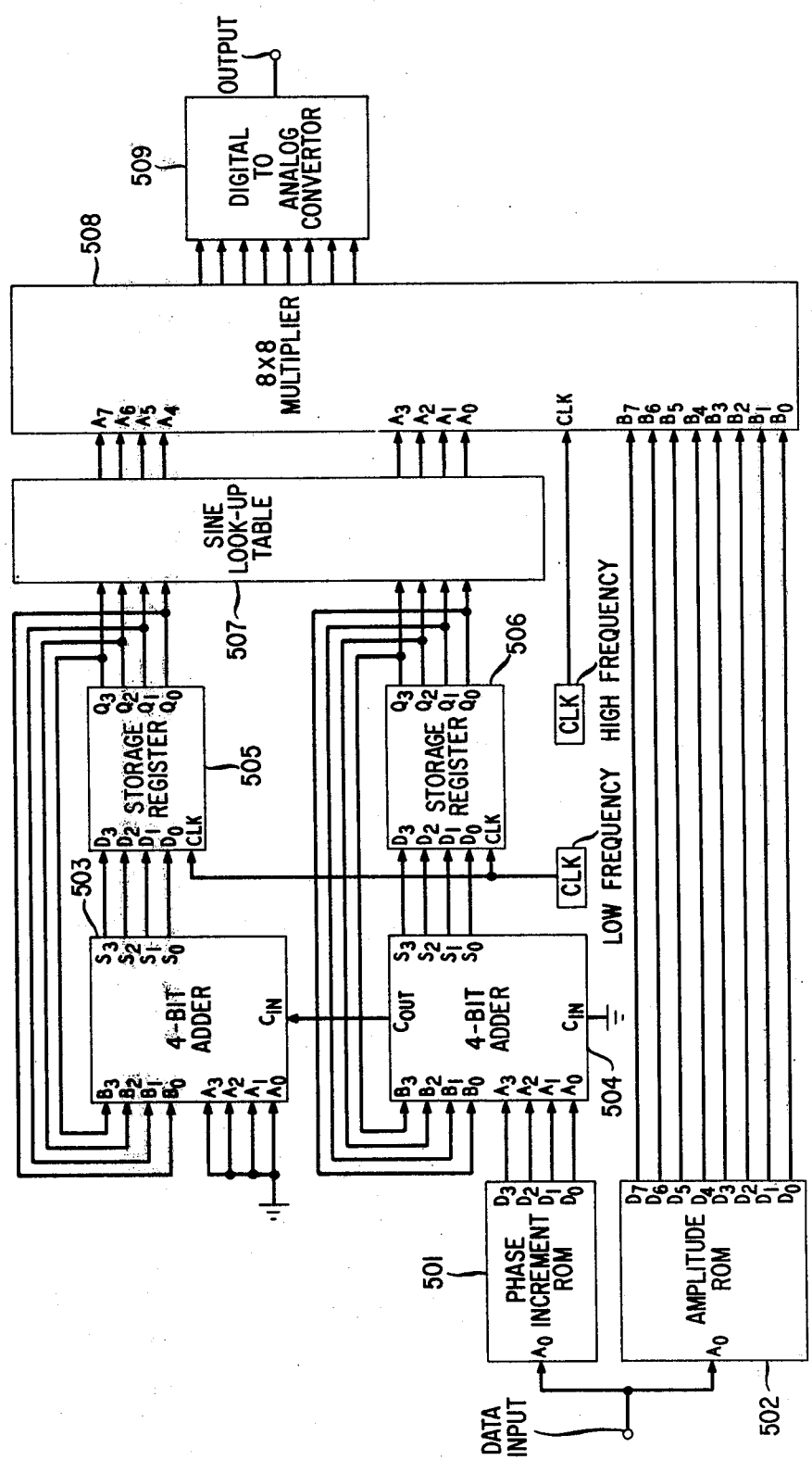
FIG. 5 discloses, in block form, an all digital embodiment of the invention.

In the circuit of FIG. 5 amplitude ROM (Read Only Memory) 502 generates one set of eight binary digits, defining one amplitude level, when the binary data input signal is a logic 1; and another set of eight binary digits, defining another amplitude level, when the binary data input signal is a logic 0. Binary output signals on leads ($D_0 \ldots D_7$) are fed into multiplier 508 input leads ($B_0 \ldots B_7$).

Phase increment ROM 501 generates a phase increment represented by a set of four binary digits on output leads $D_0$, $D_1$, $D_2$, and $D_3$. The total phase is expressed in eight binary digits and is stored in registers 505 and 506. The phase increment is added to the total phase by adders 503 and 504 where the total phase is present on the "B" inputs to each adder and the phase increment is present on the "A" inputs to adder 504. The adders perform an A+B operation; the sum is available on the "S" outputs. $C_{out}$ is an overflow of the addition operation to be fed to the next stage and is termed the carry output. $C_{in}$ is the carry input and is added to the A+B sum having a weight equivalent to the $A_0$ binary digit (i.e. the least significant digit). Phase increments are periodically added to the total phase by reading the sum into the storage registers at predetermined transition times of a clock signal. The rate at which phase increments are added will determine the frequency of the output signal. The phase increment to be added, however, is selected by the state of the binary data input signal to ROM 501. In the logic 1 state one set of four binary digits is available on output leads $D_0 \ldots D_3$; in the logic 0 state another set of four binary digits is available on output leads $D_0 \ldots D_3$.

The incrementally varying phase is converted into a sinusoidal representation by Sine Look-Up Table 507 which is a circuit that converts eight binary input digits, representing a phase quantity, into eight binary output digits representing the sine of the phase quantity (i.e. the input digits specify an address in memory containing the sine transform of those digits). Multiplier 508 digitally performs the A×B operation in a conventional digital manner at a rate set by a high frequency clock. The digital product of the multiplication is then converted into an analog quantity by digital to analog converter 509.

It should be noted in retrospect that hybrid techniques can be advantageously utilized to combine analog and digital processing. Although specific embodiments of this invention have been shown and described, it will be understood that various modifications may be made without departing from the spirit of the invention.

What is claimed is:

1. Apparatus for generating a waveform having amplitude and frequency concurrently and directly modulated by the same binary input signal including means responsive to the binary input signal for generating a frequency shift keyed output signal; characterized by:

amplification means, having a first and second gain, responsive to one state of the binary input signal for selecting the first gain to amplify the frequency shift keyed signal, and responsive to the other state of the binary input signal for selecting the second gain to amplify the frequency shift keyed signal wherein the ratio of said first and second gains is substantially between 0.6 and 0.9.

2. Apparatus for generating a waveform having amplitude and frequency concurrently and directly modulated by the same binary input signal including means responsive to the binary input signal for generating a frequency shift keyed output signal; characterized by:

means responsive to one state of the binary input signal for amplifying the frequency shift keyed signal by a nominal amount; and means responsive to the other state of the binary input signal for amplifying the frequency shift keyed signal by an amount between 0.6 and 0.9 times said nominal amount wherein the amplifying means includes a pair of amplifiers each having a different gain and selected in accordance with the state of the binary input signal.

3. Apparatus for generating a waveform having amplitude and frequency concurrently and directly modulated by the same binary input signal including means responsive to the binary input signal for generating a frequency shift keyed output signal; characterized by:

means responsive to one state of the binary input signal for amplifying the frequency shift keyed signal by a nominal amount; and means responsive to the other state of the binary input signal for amplifying the frequency shift keyed signal by an amount between 0.6 and 0.9 times said nominal amount wherein the frequency shift keyed signal is generated by periodically accumulating digital increments of phase whose amounts are regulated by the state of the binary input signal.

* * * * *